United States Patent [19]

Wyman

[11] Patent Number: 4,630,963
[45] Date of Patent: Dec. 23, 1986

[54] POLYMER CONCRETE BY PERCOLATION

[76] Inventor: Ransome J. Wyman, 821 Camino Colibri, Calabasas, Calif. 91302

[21] Appl. No.: 647,597

[22] Filed: Sep. 5, 1984

[51] Int. Cl.<sup>4</sup> .......................... E01C 7/30; C08G 18/26
[52] U.S. Cl. ....................................... 404/75; 405/264; 405/267; 528/55
[58] Field of Search ............... 404/75; 405/264, 266, 405/267; 528/55; 264/31, 109, 122

[56] References Cited

U.S. PATENT DOCUMENTS

| | | | |
|---|---|---|---|
| 3,272,098 | 9/1962 | Buchholtz et al. | |
| 3,645,945 | 2/1972 | Lesesne | |
| 3,736,758 | 6/1973 | Dolfing et al. | 405/264 |
| 3,773,697 | 11/1973 | Olstowski | |
| 3,805,531 | 4/1974 | Kistner | |
| 3,900,687 | 8/1975 | Meader, Jr. et al. | 404/75 X |
| 3,979,364 | 9/1976 | Rowton | 528/55 X |
| 4,008,576 | 2/1977 | Meyer et al. | 405/264 |
| 4,076,679 | 2/1978 | Turner | 528/55 X |
| 4,113,014 | 9/1978 | Kubens et al. | 405/264 X |
| 4,222,975 | 9/1980 | Kirschke | 405/264 X |
| 4,404,244 | 9/1983 | Springston | 404/75 X |

FOREIGN PATENT DOCUMENTS 2108553  5/1983  United Kingdom ............... 106/900

Primary Examiner—George A. Suchfield
Attorney, Agent, or Firm—Nilsson, Robbins, Dalgarn, Berliner, Carson & Wurst

[57] ABSTRACT

A composition and method for use in the repair of a roadway are described. A lower molecular weight hydroxyl terminated polyether polyol is reacted with an organic polyisocyanate in the presence of solvents having a specific gravity in excess of 1, and catalyzed by organic mercury and organic lead catalysts in amounts sufficient to cause the composition to gel in about thirty seconds. The reaction products are pumped or poured over an aggregate and allowed to percolate therethrough to form a flush roadway repair.

14 Claims, 3 Drawing Figures

POLYMER CONCRETE BY PERCOLATION

FIELD OF THE INVENTION

This invention relates to polyurethane chemistry and, more particularly, to the formation of polymer concrete by the percolation of a urethane resin through an aggregate matrix.

BACKGROUND AND SUMMARY OF THE INVENTION

Improved roadway surfaces for the support and passage of vehicles, for example, streets, highways and air fields, have long been constructed from cementitious materials such as concrete and asphalt. As is well known, the construction of roadways from such cementitious materials consumes a great deal of time, due both to the preparation of the subgrade and the curing of the cast or poured pavement. For example, while cement offers substantial advantage in such structures due to its strength, permanency and relatively low cost, it must be cured or hardened slowly over a period of about a week, during which time it must be protected from vibration, freezing and a too-rapid rate of drying. Asphalt and other coal-tar derivatives, while attaining a fair degree of strength upon cooling, require heating of various hydrocarbon derivatives and specialized application techniques in order to provide any degree of compressive strength. Accordingly, it has been a desideratum to provide a material which may be employed to rapidly and easily allow the repair of cementitious roadways.

This desire has been felt not only with regard to the repair of pot holes and the like in highways, but is particularly important in the repair of damaged runways, e.g., the repair of bomb-damaged air fields.

The optimal rapid repair system for any roadway must be structurally sound, cure virtually flush with the surrounding pavement, and be rapidly accomplished under a wide variety of temperatures and weather conditions.

Rapid runway repair has been accomplished by several methods, which proceed by first filling a roadway depression with an aggregate, such as pavement debris or crushed stone, followed by placing a rigid covering over the fill. The cover has comprised preformed metallic or concrete slabs which are anchored to existing pavement which surrounds the damaged portion. However, since these coverings must be of appreciable thickness to withstand the loads imposed by passing traffic, the transport and placement of such slabs is a significant impediment to rapid repair. Moreover, the aggregate must be carefully levelled to enable the placement of the covering flush with the existing pavement. In addition, the anchoring of such material to the surrounding pavement often creates a raised portion which may cause damage to vehicles which traverse the repair at any appreciable speed.

Poured-in-place structural caps have also been employed over the above-described aggregate fill material. This type of repair employs rapid-setting materials which have substantial flexural strength which are poured into the depression, and cure to form a flush cap above the fill material. In order to provide sufficient strength over low-strength subgrades, this cap may be as much as twelve inches thick.

Due to the problems set forth above, a number of polymer concrete materials have been proposed, along with methods for their use. For example, an acrylic polymer, methylmethacrylate, has been tested and found to provide a structural cap crater repair material which may be poured flush with the surrounding pavement. One disadvantage of the methylmethacrylate polymer concrete has been the high flammability of the monomeric precursors, which may cause substantial problems both in the storage and use of the material.

Water incompatability has been a major problem with nearly all polymers, as water is invariably found in aggregate material or in the subgrade beneath the pavement. In addition, a water intolerant material would not be usable during any amount of rainfall. Accordingly, others have selected furfuryl alcohol polymers and unsaturated polyesters to develop water-compatible systems. In addition, various water-absorbing additives have been treated, such as Portland cement and silica flour. Magnesium polyphosphate cement formulations have also been employed which permit moisture contents of up to 3 weight percent.

Polyurethane formulations have heretofore been incapable of providing satisfactory roadway repair material, particularly under wet placement conditions as the ambient moisture in the aggregate or standing water in the crater react undesirably with the isocyanate component in such formulations. This isocyanate-water reaction not only yields a low-strength polymer concrete, but also contributes to a somewhat spongy consistency of the cured material due to the formation of carbon dioxide bubbles during the polymerization reaction. Moreover, any standing water in the crater will cause the urethane to foam, and the polymer thus swells and raises above the roadway surface.

The above-described problems are most apparent when the rapid repair of bomb-damaged air fields during hostilities is attempted. The repair of air field pavements damaged by various weapons must be completed rapidly following an attack in order to launch retaliatory missions. Any repair method or material which is disposed above the level of the surrounding pavement, creating a raised portion on the runway, presents special problems for militry aircraft due, in part, to high runway speeds and heavy cargos.

For example, the repair diameter of a crater formed from the explosion of a 750 lb. bomb can measure as much as sixty feet, with a depth approaching fifteen feet. As a further complication, any repair material must be placed in less than thirty minutes under adverse battle conditions and under environmental extremes, i.e., temperatures ranging from $-25°$ F. to $125°$ F. and at rainfall rates of in excess of one inch per hour.

Further, the flammability of cured polymer concrete has presented a particular problem in military operations. For example, in one recent test, a freshly cured polyurethane repair such as described above was set afire by hevy construction equipment involved in the repair.

According to the present invention, methods and materials are provided for the formulation of a solution which may be caused to quickly percolate through at least a portion of an aggregate fill in a crater or other depression to rapidly form a polyurethane concrete which is flush with the surrounding grade. The solution is hydrophobic and has a specific gravity greater than that of water so that any ambient moisture within the crater is displaced. The combination of catalysts in the solution provide a cure rate which virtually eliminates any water-isocyanate reaction in the polymer precursor during the displacement of water, and the combination may be varied to allow cure times of as little as one second and to allow constant cure rates at temperatures of from −20° F. to 125° F. As described in the preferred embodiment, the present invention provides an all-weather flush and nonflammable pavement repair which is capable of supporting vehicular traffic in as little as thirty minutes.

DETAILED DESCRIPTION

Figure 1:
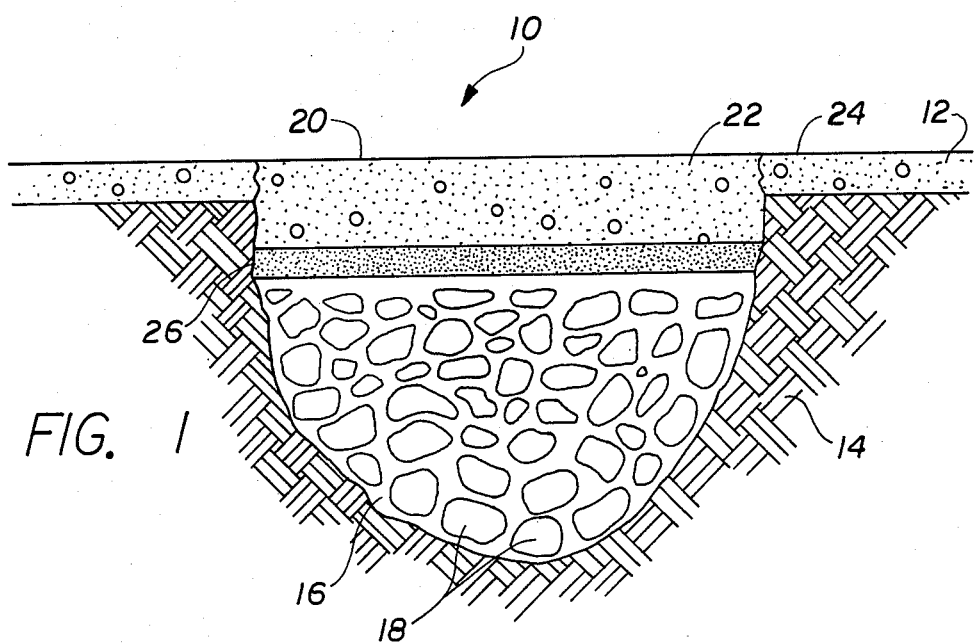
FIG. 1 is a cross-sectional representation of a crater in a roadway, repaired in accordance with the present invention.
Figure 2:
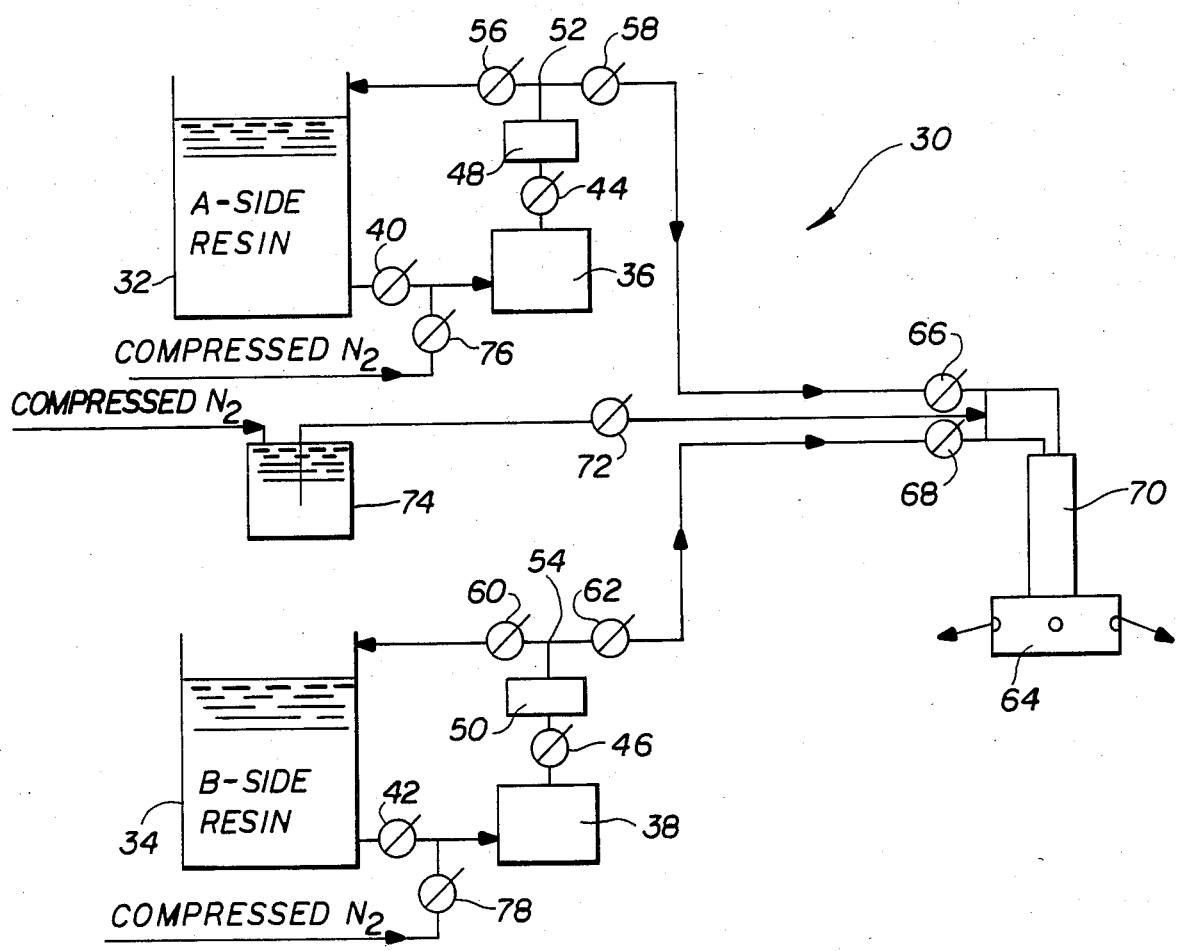
FIG. 2 is a graph showing selected exotherms from field test of the invention.

While the invention will be exemplified by reference to a specific polyurethane polymer concrete and a specific method for use in repairing roadways, the invention in general and certain aspects in particular are broad in scope, for example, the concept of percolating a high density polyurethane polymer precursor through an aggregate to form a polyurethane polymer concrete which cures with sufficient rapidity to avoid reactivity with ambient moisture. Consequently, specific details disclosed herein are merely representative and are deemed to afford the best embodiments known at this time to provide a basis for the claims which define the scope of the invention. Unless otherwise indicated by the context, all parts and percentages are expressed herein as weight percent.

With regard to the rapid-setting runway repair polymer set forth as the preferred embodiment, the polymer is formed as the reaction product of materials in a precursor solution having a specific gravity of from about 1.2 to 1.6, an initial viscosity (prior to any significant gelling or polymerization) of less than about 1.5 poise, and a gel time of less than about 30 seconds. Accordingly, the solution displaces ambient moisture and polymerizes prior to any appreciable water-isocyanate reaction which might otherwise occur, and yet percolates sufficiently through the aggregate to form a strong, low-cost runway repair.

As hereinafter described, the polymer concrete is formed from a first and second solution which include, in toto 0 to 8% of a hydroxyl-terminated polyether polyol, 23 to 35% of an organic polyisocyanate, 38 to 58% of a solvent, 8 to 16% of a diaminotetrahydroxyl polyol, 0.15 to 0.3% of an organic mercury catalyst and 0 to 1% of an organic lead catalyst. These components may be distributed in either of the first and second solutions, except that the catalysts, the diaminotetrahydroxyl polyol and the organic mercury and lead components, must be present only in the first solution and the organic polyisocyanate component must be present only in the second solution, to avoid undesired reactions therebetween.

Referring more particularly to the polymerforming materials, these precursors are advantageously provided in two separate containers, usually referred to as an A-side and a B-side, although the reactive materials other than the catalyst can be provided from one container. From the point of view of ease of measurements, the A-side and B-side are usually formulated so as to require approximately equal volume for the appropriate reaction, as will be described in more detail hereinafter.

Generally, one side comprises the isocyanate component and a portion of the solvent and oil components. The other side contains the polyol, the remaining amounts of oil and solvent, and the catalysts for the polymerization reaction. Alternatively, all of the ingredients except the catalyst can be placed in one container, in which case the streams coming from the containers must be metered appropriately to provide the desired ratio of components. Another alternative is to provide all of the polyol and isocyanate components on one side, volumetrically balancing the other side with the solvents and oils, so that the two streams are of equal volume. It is generally preferred, however, to include solvent on each side so as to maintain equal densities of the first and second sides to facilitate equal pumping rates. Most generally, the components can be combined in any ratio to fit convenient pumping apparatus.

Any of the organic polyisocyanates used in the art to prepare polyurethanes can be used, for example, hexamethylene diisocyanate; m-xylylene diisocyanate; toluene diisocyanate; polymethylene polyphenylisocyanate; 4,4'-diphenylmethane diisocyanate; m-phenylene diisocyanate; p-phenylene diisocyanate; 3,3'-dimethyl-4,4'-diphenyl diisocyanate; methylenebis(2-methyl-p-phenylene)diisocyanate; 3,3'-dimethoxy-4,4'-biphenylene diisocyanate; 2,2',4,4'-tetramethyl-4,4'-biphenylene diisocyanate; 3,3'-dimethyl-4,4'-diphenylmethane diisocyanate; 4,4'-diphenylisopropylidene diisocyanate; 1,5'-naphthylene diisocyanate; and polymethylene polyphenylisocyanate. One group of especially preferred polyisocyanates are the toluene diisocyanate isomers, particularly 2,4-toluene diisocyanate. The commercially available blends of the 2,4- and 2,6-isomers are effective—the 80:20 and 65:35 blends being most readily available. Another especially preferred polyisocyanate is polymethylene polyphenylisocyanate such as sold by the Upjohn Company under the trademark PAPI 901. This has an average molecular weight of 260–300, an isocyanate equivalent of 133, an NCO content of 31.6 weight percent, an acidity of 0.05% as HCl and a viscosity at 25° C. of 80 cps.

Most generally, the polyol can be chosen from a variety of OH terminated polyethers having a molecular weight of less than about 2000. Polyols having a molecular weight in excess of 2000 provide an unacceptable viscosity in the final solution. In particular, the polyols sold by Olin Chemicals under the trademark Poly-G are useful.

In addition, the use of polyoxyalkylene polyols having 2–4 hydroxyl groups and where the alkylene group has 2–6 carbon atoms is advantageous. A large variety of such polyols is available, obtained by polymerization of an alkylene oxide, such as ethylene oxide, propylene oxide, or butylene oxide, with a glycol. Polyethers having higher functionality may be obtained by reaction with a triol or higher polyol, such as glycerine, trimethylolpropane, and pentaerythritol. Polyols of the above types are available commercially, for example: Voranols (trademark) from Dow Chemical Company; and Pluracols (trademark) from BASF Wyandotte Corporation. In the example hereinafter set forth, where a rapid setting polymer is obtained from a solution which percolates quickly through the aggregate, an oxyalkylene polyol having two hydroxyl groups and a lower alkylene group, such as dipropylene glycol, is employed. Dipropylene glycol such as sold by the Dow Chemical Company has an average molecular weight 134 d., an equivalent weight of 67, a hydroxyl number of 836 and a viscosity at 25° C. of 74 cps. Other glycols such as ethylene glycol, diethylene glycol, triethylene glycol, tetraethylene glycol, propylene glycol and tripropylene glycol may also be used in place of or in addition to dipropylene glycol. In addition, the use of a propoxylated ethylene diamine such as the diaminotetrahydroxyl polyol entprol(N,N,N',N'-tetrakis(2-hydroxypropyl)ethylenediamine), sold by the Carpenter Chemical Corporation under the trade designation Carpol EDP-292 or by the BASF Wyandotte Chemical Corporation under the trade designation QUADROL, is preferred on the catalyst side of the formulation, and provides substantial advantages in the examples hereinafter set forth as it serves not only as part of the polymer backbone but also provides an advantageous catalytic effect on the polymerization reaction.

Further catalysts include carboxylate salts of heavy metals such as organo-metal compounds of mercury and lead. For example, mercury or lead salts of a carboxylic acid having from about 2 to about 20 carbon atoms, i.e., naphthenates, octoates, oleates and others may be employed. A preferred catalyst for the isocyanate hydroxyl reaction is an aryl mercurial catalyst, such as sold by the Cosan Chemical Corporation under the trade designation Cocure 30, which is thought to allow the development of the ultimate physical properties of the polymer concrete very quickly. The preferred organic lead catalyst, a lead soap solution (lead 2-ethylhexanoate in mineral spirits), such as the 24% lead octoate sold by the Nuodex Corporation, has been found to control the initial reaction rate and gel time when employed in combination with the other catalysts. In that regard, the lead octoate catalyst is used in amounts of from about 0 to 1% of the total composition, and allows a setting time of from over 100 seconds to as little as 1 second.

The solvents added to the formulation provide a significant advantage, especially when the solutions are desired to percolate quickly through the aggregate. In addition, the solvents act as mass to control the heat produced as the polymer-aggregate matrix cures, and thus are particularly important where large craters are to be filled. A wide variety of solvents may be employed, dependent upon the intended use of the formulation. In the examples set forth, chlorinated solvents are preferred for their fire retardancy characteristics. Solvents such as perchloroethylene, monochlorobenzene or other chlorinated solvents are preferred. With regard to flammability, perchloroethylene has no fire or flash point by either the open cup or the closed cup test method and produces a polymer concrete which will not sustain combustion. In addition, perchloroethylene is valued for its viscosity suppression in the final product mix, and primarily for its ability to displace water due to its specific gravity of 1.625. With regard to water displacement, any solvent having a specific gravity of greater than 1 will serve this purpose, dependent upon the rate and amount of water displacement desired for the particular application. If fire retardancy is not an issue, most any other solvent, excluding reactant solvents such as those containing hydroxyl, amine or thio groups, may be used.

One can use any of the processing oils commonly used to extend polymers that are compatible with the urethane precursors. Preferably, the extender oil is substantially aromatic and may contain polar compounds. A particularly effective oil is the aromatic extender oil sold under the trademark Califlux LP sold by the Witco Chemical Company. Califlux LP comprises about 78 percent aromatics and 9 percent polar compounds, the remainder being saturates. It has a specific gravity at 6° F. of 0.9786, and API gravity of 13.1, a viscosity at 40° C. of 36 cs, a flash point COC of 320° F., and an aniline point of less than 59° F.

Generally the higher the amount of polar components and aromatic content of the extender oil, the better will be the compatibility in the polyurethane composition, since polyurethane precursors have polar groups. Also, oil compatibility increases with increase in molecular weight of the polyol, assuming stoichiometry with the polyisocyanate. Accordingly, it will be advantageous to use higher molecular weight polyols.

With respect to the following examples, it should be understood that polymer concrete is useful for a wide variety of purposes, not all of which require percolation, non-flammability, water displacement or rapid cure. Accordingly, the formulations and examples set forth herein are directed to the rapid repair of roadways as detailed therein, as this method of use constitutes the best mode contemplated by Applicant of carrying out the invention.

In this regard, the ingredients in each of the A- and B-sides are proportioned to facilitate the pumping and mixing of the precursor solution, although variations therefrom may be made as long as the isocyanate and catalysts are not intermixed until immediately prior to cure. The amounts and percentages set forth in the formulations and examples herein are percentages or part by weight percent unless otherwise indicated by the context.

The isocyanate side of the formulation, herein referred to as the A-side, comprises from about 45 to 70% of an organic polyisocyanate, and from 30 to 55% of the solvent. In addition, extender oil may be included from 0 to about 30% of the A-side.

The catalyst side, referred to herein as the B-side, contains the polyol, such as 16 to 31% propoxylated ethylene diamine and from 0 to 16% dipropylene glycol, 0 to 30% extender oil and from about 45 to 60% solvent. The propoxylated ethylene diamine polyol, as mentioned above, serves in part to catalyze the polymerization reaction. In addition, organic mercury catalysts are included in amounts of from 0.3 to 0.6%, and organic lead catalysts from 0 to 2% of the B-side (i.e., 0.15 to 0.3% and up to 1%, respectively, of the total composition).

It should be stressed that the amount of organic lead catalyst in the polymerizing solution is extremely critical with regard to the reaction rate and gel time, especially in view of the wide range of temperatures over which the curing and geling reactions occur. Generally, the organic lead catalyst, e.g., 24% lead octoate, is varied in amounts of from 0 to nearly 2% of the B-side to provide a desired gel time. For example, trace amounts of lead octoate, such as 0.01% provide a pot life of two to three minutes. When added to the B-side in the amount of 2%, the gelling of the solution was nearly instantaneous. It should be understood that the gel time increases with a decrease in ambient temperature, and thus additional lead octoate is required to maintain the desired gelling point at lower temperatures. The converse is true for high ambient temperatures, and the amount of lead octoate should be decreased accordingly.

EXAMPLE I

Polymer reactants were prepared as follows:

| "A" side (parts per 100) | | "B" side (parts per 100) | |
|---|---|---|---|
| Papi 901 | 57 | Carpol EDP292 | 25 |
| Perchloroethylene | 33 | Perchloroethylene | 57.5 |
| Califlux LP | 10 | Califlux LP | 10 |
| | | Dipropylene glycol | 7 |
| | | Cocure 30 | 0.5 |

These reactants had a weight ratio (A/B) of 100/100 and a volume ratio (A/B) of 100/100. When mixed, these reactants have a specific gravity of about 1.4, and have had a pot life at 75° F. of 1 minute 40 seconds + or − 30 seconds, generally about 140 seconds.

The initial viscosity of the mixed solution, i.e., prior to any significant polymerization, may be determined from the values set forth in Table 1. Thus, the reactants of Example I had an average viscosity at 75° F. of about 27 cps. It has been found that a viscosity in excess of about 150 cps begins to inhibit the percolation of the polymerizing solution through the aggregate. Accordingly, a viscosity of less than 160 cps is preferred. The data shown in Table 1 demonstrates that the solutions of the invention have appropriate percolation characteristics at temperatures of from 0° to 110° F.

EXAMPLE II

Varying amounts of 24% lead octoate were added to the B-side and produced the following gel times at 75° F.:

| Percent | Time, in seconds |
|---|---|
| 0 | 140 |
| 0.035 | 45 |
| 0.075 | 30 |
| 0.10 | 10 |
| 0.20 | 3 |

EXAMPLE III

Using the formulation of Example I B-side, the amount of 24% lead octoate was varied, as follows, to achieve a 10 second pot life (gel time) at the following temperatures.

| Temp degree F. | % of 24% lead octoate added |
|---|---|
| 0 | 1.000 |
| 30 | 0.250 |
| 50 | 0.180 |
| 75 | 0.100 |
| 90 | 0.026 |
| 110 | 0.023 |

The formulation of Example I was repeted, and the amount of lead octoate varied to achieve a 35 second pot life at 0° and 20° F.

| Temp Degrees F. | % of 24% lead octoate added |
|---|---|
| 0 | 0.270 |
| 20 | 0.134 |

EXAMPLE IV

To further investigate the effect of climatic conditions and variations of the gel time due to the amount of organic lead catalyst, the 24% lead octoate was again varied in the formulation of Example I. Pot life was tested at 0° and 20° F.

| | Pot life at | |
|---|---|---|
| % of 24% lead octoate added | 0° F. | 20° F. |
| 0.050 | 1'50" | 1'25" |
| 0.080 | 1'43" | 1'18" |
| 0.100 | 1'34" | 50" |
| 0.134 | 1'25" | 35" |

EXAMPLE V

The 24% lead octoate in the formulation of Example I was then raised to 2%. The pot life at this concentration at 75° F. was almost instantaneous. At this level of catalyst concentration the prepolymer must be mixed and sprayed using a standard airless spray mixer such as a Binks model.

EXAMPLE VI

Additional reactants were prepared as follows:

| "A" side (parts per 100) | | "B" side (parts per 100) | |
|---|---|---|---|
| Papi 901 | 67.5 | Carpol EDP-292 | 23 |
| HI-SOL 15 | 25 | Perchlorethylene | 70.5 |
| Califlux LP | 7.5 | Dipropylene glycol | 6 |
| | | Cocure 30 | 0.5 |
| | | 24% Lead Octoate | — |

For ease of handling, the material was again proportioned and balanced so as to give a mix ratio of 1:1 by volume, which resulted in a weight ratio (A/B) of 80/100. Alternatively, all the components except the catalyst(s) could be located on one side. These reactants were mixed by hand and the precursor solution gelled in 2 minutes 20 seconds at an ambient temperature of 75° F.

The cured polyurethane resins made in accordance with the formulations set forth in Examples I–VI have been subjected to the direct heat of a propane torch numerous times, and are not flammable. The replacement of the perchloroethylene in the A-side by HI-SOL 15 (an aromatic solvent sold by the Ashland Chemical Company) did not affect the self-extinguishing properties of the original formulation.

Roadway Repair Procedure

Turning now to the drawings, the use of the polymer concrete of the invention to fill a runway crater will be described. In FIG. 1, a crater 10 is shown, having been formed in a roadway 12 which overlies a subgrade 14. The crater 10 is initially filled with a ballast stone base 16 which includes a number of stones 18 which provide support for a polymer concrete cap 20 thereabove. The use of ballast stone in the formation of roadways is known in the art and will not be further described herein.

The cap 20 is seen to comprise a layer of pea gravel, poured or raked flush with a surface 24 of the roadway 12. Beneath the pea gravel is a percolation barrier 26, which serves to inhibit the flow of the percolating resin into the ballast stone base 16. In this instance, the barrier 26 is seen to comprise about two inches of damp sand having a consistency of beach sand, although a plastic sheet percolation barrier may also be employed.

Figure 3:
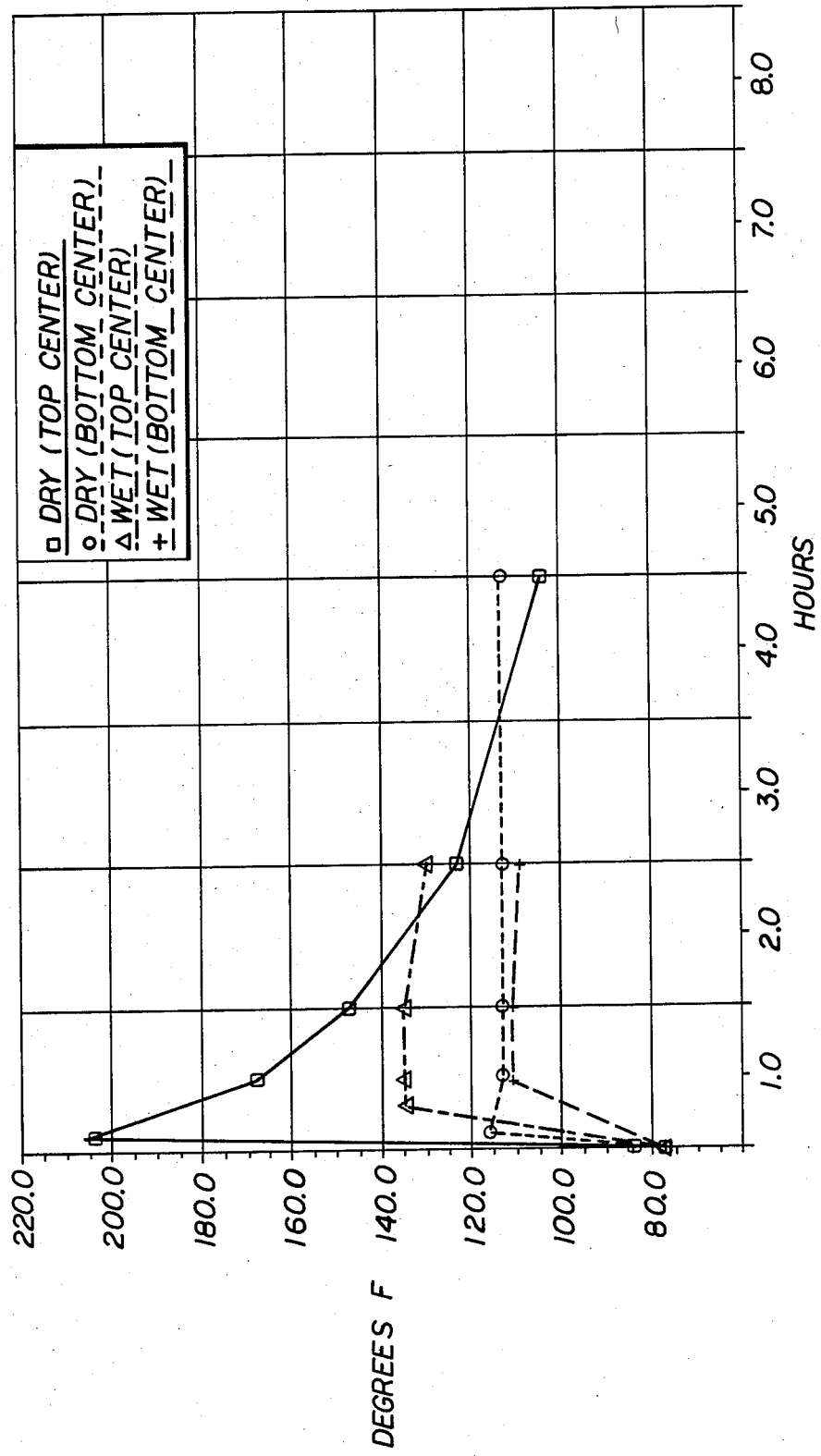
FIG. 3 is a schematic representation of the pump system employed for the percolation of the polymer concrete.

Turning now to FIG. 3, the resin solutions are delivered to the crater 10 by a system 30 which includes containers 32 and 34 for the A-side and B-side resins, respectively. The resins are pumped from the containers 32 and 34 by centrifugal pumps 36 and 38, which withdraw the respective resins through ball valves 40 and 42. Thereafter, the resins are pumped through the valves 44 and 46 and flow meters 48 and 50 to T-fittings 52 and 54 whereupon the resin flow may be directed, through use of the valves 56, 58 and 60, 62 either toward the distribution nozzle 64 or to return to the containers 32, 34 for recirculation.

After having made appropriate settings of the valves 40, 44, 56 and 58 and 42, 46, 60 and 62, the operator need only open the valves 66 and 68 to cause the resins to flow into a static mixer 70, such as are available from Ross, Kennics and Komax, wherein the A-side and B-side are mixed and delivered to the distribution nozzle 64.

Immediately after delivery of the resins, the static mixer 70 and distribution nozzle 64 must be flushed with appropriate solvents to avoid clogging of the delivery orifices with polymer. For this purpose, immediately upon closure of the valves 66 and 68 a valve 72 is opened to cause solvent from a container 74 to flow through the mixer 70 and the nozzle 64. In addition, the remainder of the system may be flushed by admitting compressed nitrogen gas through the valves 76 and 78. It should be understood that delivery systems such as that described herein are known in the art, and as they constitute no part of the invention, will not be described further herein. However, in percolating the described solutions, it is desirable to employ a pump system which provides for automatic mix ratio control and allows some throttling capability, e.g., on/off, low flow and high flow, to enable the adjustment of the flow rate to the crater size.

Runway Repair Tests

Experimental field tests were conducted by the United States Air Force Engineering and Services Center.

In a first test, a depression formed in the surface of an air field, approximately two feet deep, was partially filled with ballast stone to provide an aggregate base about 16 inches thick. This base was topped with two inches of damp beach sand, as a resin percolation barrier, and topped with six inches of pea gravel. The sand and pea gravel were applied above the ballast stone without any mechanical compaction.

As a small-scale box test had indicated that two inches of damp sand might be penetrated by the resin, the sand in the first test (dry test) was covered with a polyethylene sheet percolation barrier.

A delivery system such as is shown in FIG. 3 was employed to disperse a solution, made according to the formula set forth in Example I and including 0.10% of the lead octoate on the B-side, into the dry crater. The nozzle was first located over the center area, then moved to a high end of the crater (after about two minutes) and finally back across the center area to the lower end of the crater. The flow rate was about 60 gallons per minute. The pump was reset to 14 gpm total rate for a brief pump-off at the higher end. The center section was not deliberately topped-off again, but a traverse across it was made after the material had begun to visibly gel.

In a second test, the crater was filled during a simulated rainfall (at one inch per hour) which was started about fifteen minutes before the fill and for fifteen minutes afterward. In both this test and the dry test set forth above, the ambient aggregate moisture was estimated to be about 1.7%. The nozzle in the wet test was first located at the high end of the crater during the first half (2.5 minutes) of the test, then moved to the center, and finally to the low end. While the low end was being percolated, the high end was already setting up. The low end was topped-off at a reduced (14 gpm) flow rate before the nozzzle was flushed with solvent.

In both of the tests described herein, the solution began to gel substantially within 10 seconds, that is, had a pot life of 10 seconds, yet was of a viscosity which was low enough (27 cps at 75° F.) to allow the solution to percolate completely through the six inches of pea gravel prior to gelling. With judicious nozzle placement, it has been possible to provide a cast-in-place polymer concrete which has been poured flush with the surrounding pavement on a slope of as much as five degrees from horizontal.

Thermocouples had been placed at various locations within the pea gravel, and the temperature data set forth in Table 2 and FIG. 3 revealed that all exotherms had occurred within twenty-eight minutes, both in the wet and the dry tests.

Traffic Performance

The dry cap was trafficked about two hours after placement began, and the wet cap was trafficed at about forty-five minutes, fifteen minutes after the last exotherm had occurred. The trafficking was conducted with a cart which simulated the load provided by a F-4 aircraft (27,000 lb. gear load, 275 p.s.i. tire pressure) and a C-141 aircraft (141,000 lb. gear load, 180 p.s.i. tire pressure). The results are shown in Tables 3 and 4.

Total deflection of the dry cap during F-4 trafficking was far less than the selected 1.5 inch failure criteria, but the wet cap deflection approached this at the center location. On subsequent C-141 trafficking, additional consolidation was limited to about 0.4 inch on both caps, giving total center deflections of about one inch for the dry cap and 1.8 inches for the wet cap. However, from other data recovered during testing, it appeared that subgrade-ballast stone consolidation was responsible for a significant amount of the deflection in the wet cap. If this consolidation problem were not present, total deflections of less than 1.5 inch would be possible for the wet cap.

TABLE 1

| Degree F. | Centipoise | |
| --- | --- | --- |
| | "A" | "B" |
| 0 | 104 | 100 |
| 5 | 85 | 95 |
| 10 | 74 | 90 |
| 20 | 58 | 75 |
| 30 | 49 | 50 |
| 40 | 36 | 47 |
| 50 | 28 | 47 |
| 60 | 24 | 45 |
| 70 | 20 | 40 |
| 80 | 17 | 31 |
| 90 | 17 | 33 |
| 100 | 14 | 20 |
| 110 | 9 | 30 |

TABLE 2

| Themocouple Location | Start °F. | Exotherm °F. | Hrs.: min. | Temperature, °F. 0.5 hr. | 1 hr. | 2 hr. | 4 hr. |
|---|---|---|---|---|---|---|---|
| Dry Cap | | | | | | | |
| Top west | 82 | 161 | 0:18 | 158 | 148 | 132 | 113 |
| Top center | 84 | 204 | 0:06 | 168 | 147 | 123 | 104 |
| Top east | | | | | | | |
| Middle center | 81 | 152 | 0:28 | 152 | 149 | 136 | 113 |
| Bottom west | 77 | 137 | 0:12 | 132 | 128 | 124 | 118 |
| Bottom center | 84 | 116 | 0:06 | 113 | 113 | 113 | 112 |
| Bottom east | | | | | | | |
| Resins | ≧83 | | | | | | |
| Wet cap | | | | | | | |
| Top west | | | | | | | |
| Top center | 78 | 135 | 0:18 | 135 | 135 | 130 | — |
| Top east | 78 | 135 | 0:12 | 125 | 118 | 108 | — |
| Middle center | 78 | 147 | 0:12 | 141 | 130 | 117 | — |
| Bottom west | | | | | | | |
| Bottom center | 78 | 111 | 0:28 | 111 | 111 | 109 | — |
| Bottom east | 78 | 139 | 0:16 | 138 | 133 | 122 | — |
| Resins | ≧83 | | | | | | |

TABLE 3

DEFLECTION WITH F-4 LOAD.
Data average of measurements from two test lanes adjacent to load wheel.

| Pass No. | Deflection, inches Inches From West Edge | | | Inches From East Edge | | |
|---|---|---|---|---|---|---|
| | $2^a$ | 12 | 60 | 60 | 12 | $2^a$ |
| 1 | .03 | .07 | .45 | .37 | .32 | .10 |
| 17 | .04 | .08 | .36 | .65 | .50 | .22 |
| 33 | — | — | — | — | — | — |
| 73 | .05 | .18 | .51 | .84 | .63 | .40 |
| 153 | .12 | .25 | $.47^b$ | 1.01 | .75 | .53 |
| 233 | .20 | .40 | $.54^b$ | 1.06 | 1.41 | .53 |
| 393 | .12 | .42 | $.61^b$ | 1.16 | 1.01 | .64 |
| 713 | .16 | .44 | $.59^b$ | 1.22 | 1.20 | .77 |
| 1033 | .19 | .53 | $.62^b$ | 1.40 | 1.23 | .81 |

$^a$Load cart actually located at 12 inch position for this measurement (location at measurement point for other positions).
$^b$Data from Lane 6 only as Lane 4 gave about 1.3 inch "deflection" after 233rd pass and failed near 713th pass (top layer spalled off and patched).

TABLE 4

DEFLECTION WITH C-141 LOAD.

| Pass No. | C-141 Center Line Position | Deflection, inches (dry) Inches From West Edge | | | | (wet) Inches From East Edge | | | |
|---|---|---|---|---|---|---|---|---|---|
| | | 2 | 12 | 36 | 60 | 84 | 60 | 36 | 12 | 2 |
| 1 | $36^a$ | No data collected during early passes | | | | | | | | |
| | $60^b$ | | | | | | | | | |
| 15 | 36 | | | | | | | | | |
| | 60 | | | | | | | | | |
| 29 | 36 | | | | | | | | | |
| | 60 | | | | | | | | | |
| 63 | 36 | 08 | .06 | .20 | .17 | — | — | — | — | .10 | .03 |
| | 60 | — | — | — | — | .23 | .15 | .15 | .19 | — | — |
| 97 | 36 | 09 | .09 | .22 | .21 | — | — | — | — | .15 | .06 |
| | 60 | — | — | — | — | .26 | .18 | .20 | .23 | — | — |
| 131 | 36 | 11 | .11 | .22 | .30 | — | — | — | — | .20 | .08 |
| | 60 | — | — | — | — | .33 | .24 | .25 | .27 | — | — |
| 199 | 36 | — | — | — | — | — | — | — | — | — | — |
| | 60 | — | — | — | — | — | — | — | — | — | — |

$^a$Load cart tires adjacent to 12 and 60 inch positions.
$^b$Load cart tires adjacent to 36 and 84 inch positions.

What is claimed is:

1. A method for the repair of a roadway having a cavity therein, comprising:
   filling the cavity with an aggregate;
   forming a solution comprising from about 0 to 8% of an OH terminated polyether polyol having a molecular weight of less than 2,000, from about 23 to 35% of an organic polyisocyanate from about 38 to 58% of a solvent having a specific gravity of greater than 1, from about 8 to 16% of a diaminotetrahydroxyl polyol, from about 0.15 to 0.3% to an organic mercury catalyst and from about 0 to 1% of an organic lead catalyst; and
   dispersing the solution through the aggregate and allowing the solution to percolate therethrough to fill the cavity.

2. The method of claim 1 wherein the diaminotetrahydroxyl polyol is
   N,N,N',N'-tetrakis(2-hydroxypropyl)ethylene diamine.

3. The method of claim 1 or 2 wherein the organic lead catalyst is included in an amount sufficient to cause the solution to gel within less than thirty seconds.

4. The method of claim 3 wherein the solvent is perchloroethylene.

5. A method for filling an aggregate matrix with solid material, comprising forming a solution having a specific gravity of from about 1.25 to 1.6 and an initial viscosity of less than 150 cps, and including:
   from about 8 to 16% of a diaminotetrahydroxyl polyol,
   from about 38 to 58% of a solvent,
   from about 23 to 35% of an organic polyisocyanate,
   from about 0 to 8% of an OH-terminated polyether polyol having a molecular weight of less than 2,000,
   from about 0.15 to 0.3% of an organic mercury catalyst, and
   from about 0 to 1% of an organic lead catalyst;
   dispersing the solution into the aggregate matrix, and allowing the solution to polymerize to form the solid material.

6. The method of claim 5 wherein the diaminotetrahydroxyl polyol is
   N,N,N',N'-tetrakis(2-hydroxylpropyl)ethylene diamine.

7. The method of claim 5 or 6 wherein the solvent is perchloroethylene.

8. The method of claim 7 wherein the solution polymerizes in less than 30 seconds after the solution is formed.

9. A method for the formation of a polyurethane concrete, comprising:
   providing a first solution and a second solution, including, in toto,
   from about 0 to 8% of an OH-terminated polyether polyol having a molecular weight of less than 2,000,
   from about 38 to 58% of a solvent having a specific gravity of less than 2,000,
   from about 23 to 35% of an organic polyisocyanate,
   from about 8 to 16% of a diaminotetrahydroxyl polyol,
   from about 0.15 to 0.3% of an organic mercury catalyst, and
   from about 0 to 1% of an organic lead catalyst,
   with the organic lead catalyst, organic mercury catalyst and the diaminotetrahydroxyl polyol being present only in the first solution and the organic polyisocyanate being present only in the second solution;
   mixing the first and second solutions to form a third solution; and
   dispersing the third solution through an aggregate matrix to form the polyurethane concrete.

10. The method of claim 9 wherein the first and second solutions have a combined specific gravity of from about 1.25 to 1.6 and an average viscosity, prior to mixing, of less than about 150 cps.

11. The method of claim 9 or 10 wherein the organic lead catalyst is included in an amount sufficient to cause the solution to gel within less than 30 seconds.

12. The method of claim 11 wherein the solvent is perchloroethylene.

13. A method for the formation of a polyurethane concrete, comprising:

providing an aggregate matrix;

forming a solution having an initial viscosity of less than about 150 centipoise, and comprising, from about 0 to 8% of an OH-terminated polyether polyol having a molecular weight of less than 2,000, from about 23 to 35% of an organic polyisocyanate, from about 38 to 58% of a solvent having a specific gravity of greater than 1, from about 8 to 16% of a diaminotetrahydroxyl polyol, from about 0.15 to 0.3% of an organic mercury catalyst and from about 0 to 1% of an organic lead catalyst; and dispersing the solution through the aggregate and allowing the solution to percolate therethrough and solidify, to form the polyurethane concrete.

14. The method of claim 13 wherein the organic lead catalyst is included in an amount sufficient to cause the solution to solidify within less than thirty seconds.

* * * * *